Patented Jan. 27, 1953

2,626,862

UNITED STATES PATENT OFFICE 2,626,862

METHOD OF KILLING PLANTS

Percy W. Zimmerman and Albert E. Hitchcock, Yonkers, N. Y., assignors to Boyce Thompson Institute for Plant Research, Inc., Yonkers, N. Y., a corporation of New York No Drawing. Application June 30, 1950, Serial No. 171,574

6 Claims. (Cl. 71—2.7)

This invention relates to herbicides and has for its object the provision of an improved method of suppressing the growth of plants with a new herbicidal composition. Our invention is based upon the discovery that undecylenic acid and halogenated undecylenic acid, their salts, esters and amides and the corresponding aldehydes which oxidize readily to such acids have pronounced herbicidal properties. As used herein, the word "suppressing" refers to actual or complete killing and partial killing of the plant.

The following undecylenates are especially effective herbicides: Undecylenic acid, methyl undecylenate, isobutyl undecylenamide, n-undecylenic aldehyde, brominated undecylenic acid, and polyethylene glycol (300) undecylenate.

The aforementioned undecylenates are herbicides which kill many plants including most common weeds when applied to the foliage as a spray, especially an aqueous spray, for example, in concentrations of from 0.3% to 10%.

The undecylenates are derived from undecylenic acid, a relatively inexpensive compound which may be produced in various ways, notably as a fraction of castor oil. The various derivatives of undecylenic acid may be prepared by means well known in the art. These compounds are relatively insoluble in water but may be dispersed in water with suitable solubilizers and emulsifiers. Suitable compositions comprising the compound dispersed in water may be prepared by adding, for example, Solvesso 100 oil, Cellosolve, and Emulfor Ela, to the undecylenate and diluting with water.

The results of the application of aqueous spray compositions of undecylenic acid in various concentrations to many weeds and crop plants are illustrated in Table I. In carrying out a method of the invention, the results of which are reported in Table I, the foliage of the plants was treated with an aqueous spray in which undecylenic acid was dispersed by means of Solvesso 100 oil. Table I shows that undecylenic acid does not kill plants outright in concentrations below around 0.3%; however, in higher concentrations it is an effective killer. Undecylenic acid does not kill grasses in relatively low concentrations but in proper dosage will kill crabgrass without noticeable injury to lawn grasses.

The undecylenates of the invention may be used very effectively in compositions comprising 2,4-D or chloropicrin. The effect is either synergistic or mutual activation. In any event, the mixtures are more effective than the separate effects of the compounds. Table II shows the results of combining undecylenic acid and 2,4-D.

The tests of Tables I and II were based upon treatment of plants in greenhouses. The same tests have been carried out on plants in the field with surprisingly better results than the greenhouse tests.

At the present time there is no satisfactory herbicide for applying to the weeds in rows of growing vegetables, such as potatoes, carrots, cabbage, beans, and the like, where it is necessary to follow one crop with another. The compounds of the invention exhibit no objectionable residual effect. In fact, seeds can be planted the day after spraying the soil. The compounds produce rapid killing and do not impart any objectionable taste to vegetables sprayed between the rows. The compounds may be applied in such concentrations as to effect a mere defoliation or to the flowers or young set fruit (calyx stage) to effect blossom or fruit thinning. They may be applied, for example, to potato vines just before harvesting to kill the vines, without injury to the tubers.

Chloropicrin may be included in the compositions of undecylenates to intensify the action of the composition. Chloropicrin is especially effective in the composition to kill soil-borne fungus such as *S. rolfsii* which produces a blight on plants. In the composition, the fungicidal properties of the chloropicrin are intensified. Table III shows the effect of using compositions comprising chloropicrin and undecylenic acid.

Our application Serial No. 171,572, filed June 30, 1950, covers compositions comprising undecylenic acid and chloroacetic acid.

TABLE I

*Minimum percentage concentrations of undecylenic acid sprays effective for inducing the responses indicated.*

| Species | Column Number | | | | |
|---|---|---|---|---|---|
| | 1 | 2 | 3 | 4 | 5 |
| | Complete plant killing | Complete top killing | Severe foliage injury | Slight foliage injury [1] | No injury |
| Weeds: | | | | | |
| Clover | >1.0 | 1.0 | >0.32 | 0.32 | 0.1 |
| Chickweed | 3.2 | 1.0 | >0.32 | 0.32 | 0.1 |
| Oxalis | 3.2 | 1.0 | 0.32 | 0.1 | 0.032 |
| Galinsoga | 3.2 | 1.0 | 0.32 | <0.32 | <0.32 |
| Amaranthus | 1.0 | 1.0 | 0.32 | <0.32 | <0.32 |
| Chenopodium | 1.0 | 1.0 | 0.32 | <0.32 | 0.1 |
| Smartweed | 3.2 | 3.2 | 1.0 | 0.32 | 0.1 |
| Purslane | 1.0 | 1.0 | 0.32 | <0.32 | <0.32 |
| Crab grass | 3.2 | 1.0 | 0.32 | <0.32 | <0.32 |
| Water hyacinth | >3.2 | 3.2 | 1.0 | <1.0 | <1.0 |
| Alligator weed | >3.2 | 3.2 | 1.0 | <1.0 | <1.0 |
| Wild carrot | 1.0 | 1.0 | 0.32 | <0.32 | <0.32 |
| Algae | 1.0 | 1.0 | <1.0 | <1.0 | <1.0 |
| Crop Plants: | | | | | |
| Tomato | 1.0 | 1.0 | 0.32 | <0.32 | 0.1 |
| 3–4" corn | >3.2 | 3.2 | 0.32 | 0.1 | 0.032 |
| 18–24" corn (basal) | 3.2 | 3.2 | 1.0 | <1.0 | <1.0 |
| Gladislus | 3.2 | 3.2 | 1.0 | <1.0 | <1.0 |
| 12" peach seedlings | >3.2 | >3.2 | 3.2 | 1.0 | <1.0 |
| Pine seedlings | >3.2 | >3.2 | 1.0 | <1.0 | <1.0 |
| Orchid | >1.0 | >1.0 | >1.0 | 1.0 | 1.0 |
| Taxus | >1.0 | >1.0 | >1.0 | >1.0 | 1.0 |
| Carnation | >1.0 | >1.0 | 1.0 | <1.0 | <1.0 |
| Sorghum | 1.0 | 1.0 | <1.0 | <1.0 | <1.0 |
| Lawn grasses | 3.2 | 1.0 | 0.32 | 0.1 | 0.032 |
| Barley | 3.2 | 1.0 | 0.32 | 0.32 | 0.1 |
| Buckwheat | 3.2 | 1.0 | 1.0 | 0.32 | 0.1 |

NOTE.—Apparently not translocated.
[1] Considered tolerant.

TABLE II

*Increased effectiveness in killing due to compositions of 2,4-D and undecylenic acid*

| Percentage concentration of the acid alone or in mixtures | | Percentage of plants killed | Time to kill (days) |
|---|---|---|---|
| Undecylenic | 2,4-D | | |
| 1.0 | | 66 | 14 |
| | 0.1 | 100 | 13 |
| 1.0 | 0.1 | 100 | 5 |
| 0.5 | | 0 | |
| | 0.1 | 100 | 13 |
| 0.5 | 0.1 | 100 | 8 |
| 1.0 | | 66 | 14 |
| | 0.001 | 0 | |
| 1.0 | 0.001 | 100 | 5 |

TABLE III

| Mixture used in soil | | | Mortality of sclerotia in soil receiving the following milliliters of the mixture per ½ gal. crock of soil | | | |
|---|---|---|---|---|---|---|
| Chloropicrin | Solvent Naphtha | Undecylenic Acid | .07 | .20 | .60 | 1.80 |
| Percent | Percent | Percent | Percent | Percent | Percent | Percent |
| 15 | 85 | | 0 | 0 | 85 | 80 |
| 15 | 77 | 8 grams | 12.5 | 82.5 | 90 | 95 |
| check | | | 0 | | | |

We claim:

1. The method of suppressing the growth of plants which comprises applying to the plant a composition comprising undecylenic acid dispersed in water at a concentration of from 0.3% to 10%.

2. In the method of claim 1, applying the composition in such a concentration as to kill only a part of the plant.

3. In the method of claim 1, applying the composition in such a concentration as to kill the entire plant.

4. The method of suppressing the growth of plants which comprises applying to the plant a composition comprising an undecylenate of the group consisting of undecylenic acid, methyl undecylenate, isobutyl undecylenamide, n-undecylenic aldehyde, brominated undecylenic acid, and polyethylene glycol (300) undecylenate in water at a concentration of from 0.3% to 10%.

5. In the method of claim 4, applying the composition in such a concentration as to kill only a part of the plant.

6. In the method of claim 4, applying the composition in such a concentration as to kill the entire plant.

PERCY W. ZIMMERMAN.
ALBERT E. HITCHCOCK.

REFERENCES CITED

The following references are of record in the file of this patent:

UNITED STATES PATENTS

| Number | Name | Date |
|---|---|---|
| 2,390,941 | Jones | Dec. 11, 1945 |

OTHER REFERENCES

Chemical Abstracts, vol. 42, column 3803h (1948), abstract of article by Brodersen et al.

"The Chemistry and Uses of Insecticides," De Ong (1948), pages 173 and 174.